Oct. 28, 1958 W. F. LASER 2,858,149
ROTARY SEAL
Filed March 23, 1954 2 Sheets-Sheet 2

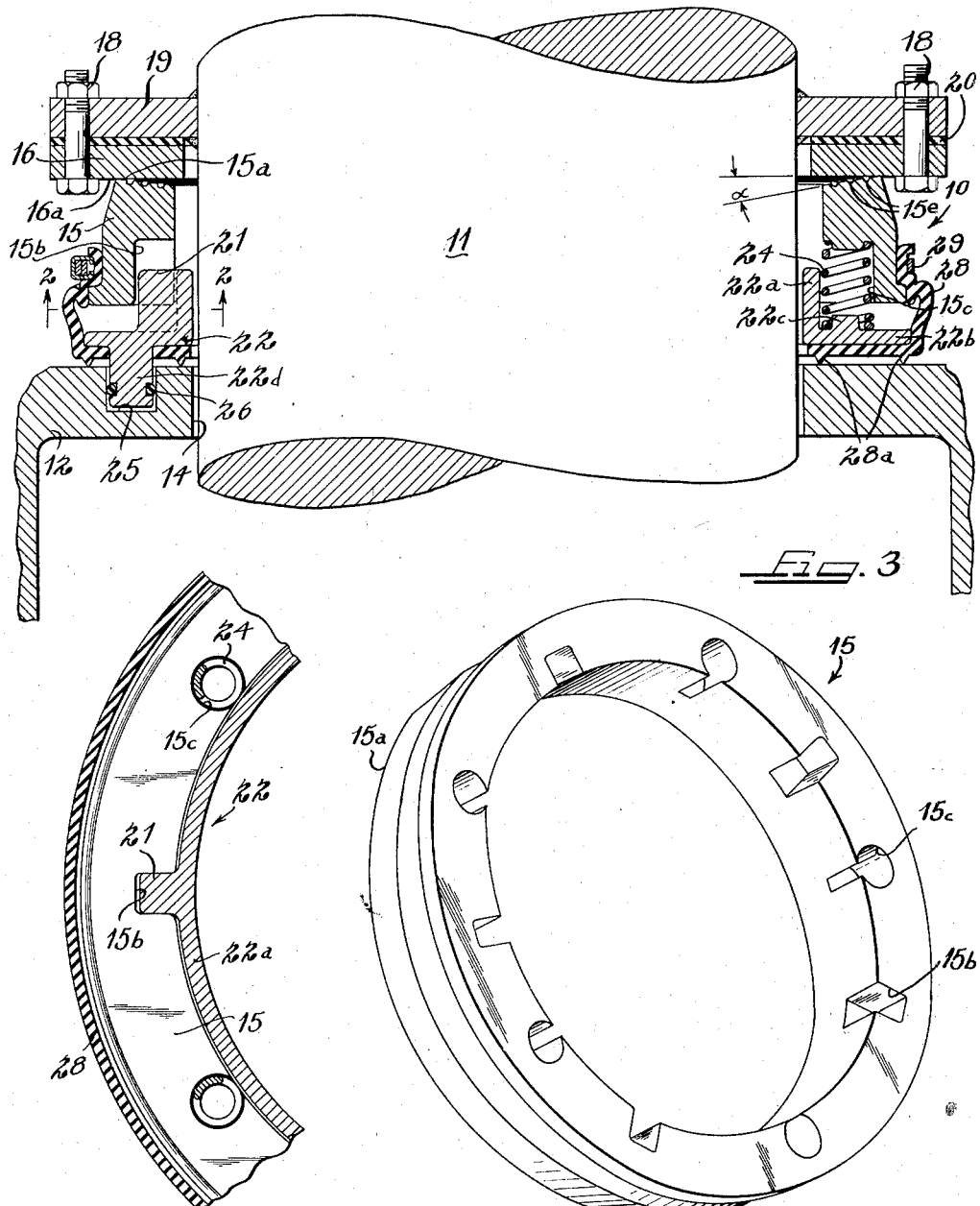

INVENTOR
WILLIAM F. LASER
by Carlson, Pitzner, Hubbard & Wolfe
Attys.

United States Patent Office 2,858,149
Patented Oct. 28, 1958

2,858,149

ROTARY SEAL

William F. Laser, Hinsdale, Ill., assignor to City National Bank and Trust Company of Chicago, as trustee under the Cartridge Type Seal Liquidation Trust Application March 23, 1954, Serial No. 418,184

5 Claims. (Cl. 286—11.14)

This invention pertains to rotary seals for preventing the transfer of fluids, either gases or liquids, between relatively rotating parts, such as a shaft journaled in and extending through a machine. More particularly, the invention relates to improvements in seals of the type employing flexible sleeves or boots connected between members movable relative to one another in an axial direction for take-up of wear on running, sealing surfaces.

The general aim of the invention is to provide an especially rugged and effective novel rotary seal of the foregoing type which is substantially immune to mechanical or thermal distortions of the parts to be sealed and which is greatly simplified in organization and construction.

Another object of the invention is to provide such a seal which is compact and readily employed in machines having little space to spare, but which, nevertheless, is made rugged and efficient by an organization permitting that part on which a sealing surface is lapped to be relatively large, strong, and massive, thereby preventing warping of the flat sealing surface.

A further object of the invention is the provision of a seal having lapped mating and rubbing surfaces one of which is inclined relative to the other to provide a broad line contact rather than face-to-face engagement, thereby assuring that if grit or foreign particles should find their way between the sealing surfaces, the resultant wear does not destroy the seal but merely radially shifts the line of sealing contact.

It is still another object to provide such a seal in which all the parts are susceptible of economical manufacture and assembly, especially through the provision of an arrangement in which a part of the flexible sleeve or boot serves additionally as a gasket.

Other objects and advantages will become apparent as the following description proceeds, taken in conjunction with the accompanying drawings, in which:

Figure 1 is a longitudinal section of a boot-type rotary seal embodying the features of the invention and shown as applied between a machine shaft and housing;

Fig. 2 is a fragmentary detail view in section, taken substantially along the line 2—2 in Fig. 1;

Fig. 3 is a perspective view of one of the sealing rings employed in the seal illustrated in Fig. 1;

Figure 4:
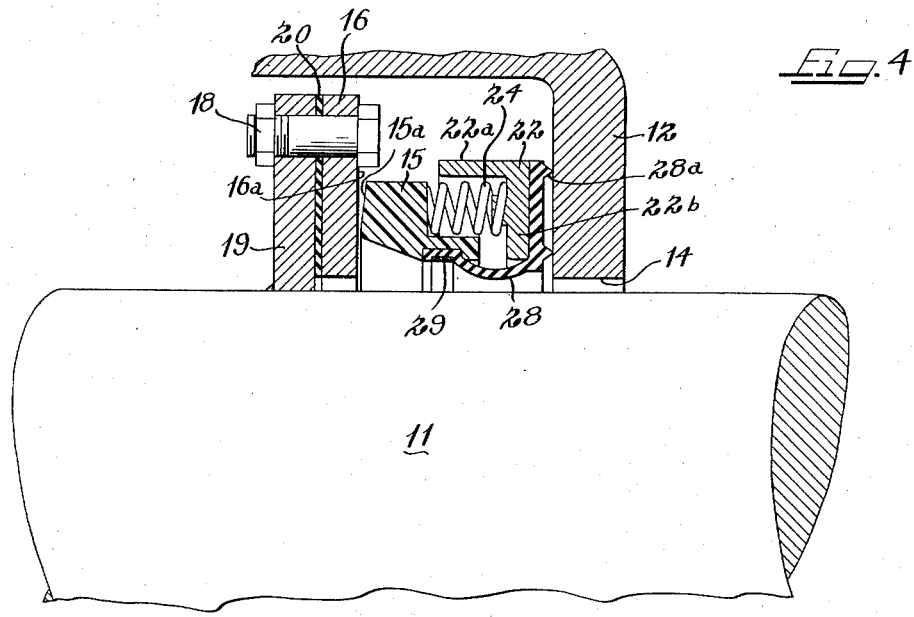
Fig. 4 is a fragmentary sectional view of a rotary seal constituting a first modified embodiment of the invention.

While the present invention has been illustrated and is described in some detail with reference to particular embodiments thereof, there is no intention that it thus be limited to such detail. On the contrary, it is intended here to cover all modifications, alterations, and equivalents falling within the spirit and scope of the invention as defined in the appended claims.

Referring now to the drawings, and first to Figs. 1-3, an exemplary rotary seal 10 embodying the invention is there shown as applied between a rotary shaft 11 and a machine housing 12, these latter parts being represented by fragmentary illustration since they may constitute parts of any one of a wide variety of machines. It will be understood that the shaft 11 is journaled by suitable bearings (not shown) within the housing 12 and projects through an opening 14 in the latter. While the seal 10 may be employed to prevent the transfer of any fluid from the interior to the exterior of the housing, or vice versa, the present seal will be described with the exemplary assumption that it is intended to prevent the loss of bearing oil from within the housing 12 to the exterior of the latter.

The seal 10 comprises as its main components a pair of mating sealing rings 15 and 16, one of which is stationary and the other of which rotates with the shaft 11. To prevent the escape of oil, these rings are formed with mating, rubbing surfaces lapped to a high degree of flatness and smoothness, and means are provided for biasing such surfaces into firm contact.

As shown in this instance, the rotary sealing ring 16 is annular in shape and mounted for rotation with the shaft 11 by means of bolts 18 extending through a flange 19 welded or otherwise suitably fixed to the shaft. Preferably a resilient washer 20 is interposed between the flange 19 and the sealing ring 16, permitting the latter to be positioned in a plane transverse to the axis of the shaft 11 by adjustments of the bolts 18 even though the flange 19 might be slightly skewed. The washer 20 also prevents the loss of oil running down along the shaft through the space left by the adjacent surfaces of the flange 19 and sealing ring 16. The inner end of the sealing ring 16 has a sealing surface 16a which is lapped to a high degree of flatness, for example, to irregularities of less than eleven-millionths of an inch. A running or rubbing contact of the mating surface 15a on the stationary sealing ring 15 thus prevents the loss of oil from inside the housing through the annular line of contact, as described more fully below.

The stationary sealing ring 15 is also annular in shape and adapted in a manner, particularly to be described, to be mounted on the housing 12 so as to be non-rotatable but yet so as to be axially shiftable under the influence of biasing means urging its mating surface into contact with the sealing surface 16a. It is particularly important that such spring means be included in the seal assembly and that considerable pressure is exerted between the two mating seal surfaces. At the same time the stationary ring 15 must be movable in an axial direction relative to the housing 12 in order to compensate for wear between the sealing surfaces, or for slight axial shifting of the shaft 11. And, while the stationary sealing ring 15 must be axially shiftable, it is nevertheless imperative that no leakage paths exist between the inside of the housing and the parts which connect the ring 15 to the housing.

All of these factors must be taken into consideration in the construction of a rotary seal. But as a foremost factor, the two lapped, rubbing surfaces 16a, and 15a must be kept perfectly flat and undistorted lest their sealing contact be destroyed. That is, there can be no warping of the sealing ring 15, which might destroy its sealing contact with the rotary ring 16, as a result of thermally or mechanically induced stresses in the machine housing. Such warping of a sealing element has heretofore been one of the predominate causes for the failure of prior rotary seals.

In accordance with the present invention, the above problems are all solved by a unique and simplified construction which focuses upon one primary object, namely, to provide for the sealing ring 15 to be large and massive compared to the other components. At the same time, the invention provides that such other components are relatively small, so that the entire seal assembly requires little space.

Referring more especially to Fig. 3, it will be perceived that the sealing ring 15 is generally annular in shape, having at one axial end the sealing surface 15a and at the opposite axial end a plurality of alternately circumferentially spaced keyways 15b and circular recesses 15c. These keyways 15b and recesses 15c cooperate respectively with projections or keys 21 formed on a mounting ring 22 and with a corresponding plurality of coil compression springs 24 in order to mount the ring 15 in non-rotatable but axially shiftable and biased relation to the housing 12.

Upon reference to Figs. 1 and 2, it will be seen that the mounting ring 22 is an annular member of relatively light metal construction, having a thin axial wall 22a and a thin radial wall 22b. The plurality of circumferentially spaced keys 21 extend radially from the wall 22a and axially from the wall 22b and are located so as to slide smoothly into the correspondingly located keyways 15b in the stationary sealing ring 15. Relative rotation between the mounting ring 22 and the sealing ring 15 is thus effectively prevented while relative axial movement is permitted. Further, at circumferentially spaced locations around the radial wall 22b, there are a plurality of bosses 22c which are located to register with the recesses 15c in the sealing ring 15. The several compression springs 24, therefore, are axially interposed between the corresponding bosses 22c and recesses 15c, thus serving to bias the sealing ring 15 axially outward and to bring the surface 15a of the latter into firm abutting engagement with the mating surface 16a.

For removably connecting the mounting ring 22 with the housing 12, the latter is provided with a plurality of circularly spaced recesses 25 which are located to receive a corresponding plurality of axially extending pins 22d on the inner face of the radial wall 22b. In order to render the engagement of the pins 22d in the recesses 25 relatively snug, each of the pins is formed with an annular groove into which a circular O ring 26 is placed, the latter being of deformable resilient material such as rubber and providing a deformable and sealing connection between each pin and the walls of its surrounding recess.

With such an arrangement, it is necessary to assure that oil from the interior of the housing 12 does not pass through the opening 14 and between either the exterior surface of the housing and the inner surface of the wall 22b or between the mounting ring 22 and the stationary sealing ring 15. Oil leakage at both of these points is effectively precluded, in accordance with the invention, by the employment of a resilient sleeve or boot 28 which is bonded at its outer end to the exterior surface of the sealing ring 15 and preferably also clamped by a metal band 29. The boot 28 at its inner end is curved radially inward and fitted over the inner surface of the wall 22b, the pins 22d extending through properly located openings in this radially inturned section of the boot. The boot thus not only prevents the loss of oil or other fluid between the mounting ring 22 and the sealing ring 15 while permitting axial movement between the latter two parts by virtue of slack in its axial length, but also serves as an efficient gasket interposed between the sealing ring 22 and the housing 12. Preferably, the inner face of the boot 28 has integrally formed annular projections 28a which are deformed into positive sealing engagement with the outer face of the housing 12 under the influence of the compression springs 24.

In the practice of another important feature of the invention, the lapped sealing surface on one of the sealing rings 15 or 16 is inclined at an acute angle from a plane transverse to the axis of the shaft 11 and from the plane of the other sealing surface. As shown in this instance, the outer end of the sealing ring 15 is "dished" so that the surface 15a is inclined relative to the mating surface 16a by a slight angle indicated by the symbol $\alpha$. The outer portion of the sealing surface 15a wears flat in rubbing against the mating surface 16a under the influence of the compression springs 24, and thus establishes a broad line annular contact which effectively prevents loss of oil between such surfaces.

The adverse effects of dirt, grit, and other foreign particles, which are the eternal foes of rotary seals, are practically neutralized. If foreign particles should work their way in between the outermost contacting surface portions, the resultant wear brings a fresh inwardly adjacent portion of the surface 15a into sealing engagement with the surface 16a to re-establish an effective seal.

This is in marked improvement over prior seals in which sealing surfaces have been placed in full face-to-face engagement. In such prior seals, a slight amount of grit finding its way between the outer edge of the mating surfaces literally "lifts" them apart, permitting loss of oil and the travel of additional particles across the entire radial dimension of the surfaces so that the resultant wear destroys their smoothness and sealing properties. Not only is oil lost, but such foreign particles finding their way into bearings or other finely machined rubbing parts quickly destroys their efficiency.

It is to be noted that the sealing surface 15a has a plurality of concentrically spaced grooves 15e defined in it, leaving intermediate ridges which may be brought successively into sealing contact with the surface 16a as wear occurs. These grooves impede the progression of foreign particles from the outer edges of the sealing surfaces toward the inner edges. Particles finding their way between the outermost ridge and the surface 16a on progressing inwardly fall into the first groove 15e and therefore cannot destroy the sealing relation subsequently formed by the second ridge as it wears into flat abutment against the surface 16a. These grooves 15e are therefore not labyrinths in the true sense as employed in some prior seals, although they may so appear at first glimpse; they are, more accurately, "grit traps" which effectively isolate one ridge from the other so that a series of independent seals are successively effected automatically in the event that the outermost one is damaged. The life of the entire seal is therefore much greater and it may be employed with a high degree of dependability under the most severe conditions, for example, external of the housing on the shafts for drive wheels in track-laying tractors or tanks.

It is believed that the operation and advantageous construction of the seal shown in Figs. 1–3 will be apparent from the foregoing. However, in summary it may be pointed out that bearing oil in the housing 12 cannot escape through the opening 14 and along the shaft 11 because, in the first instance, the inturned end of the boot 28 forms an efficient gasket between the outer face of the housing 12 and the mounting ring 22. Oil passing through the opening 14 cannot seep between the mounting ring 22 and the sealing ring 15 because the axial portion of the boot 28 is bonded and clamped to these two parts. Finally, oil cannot escape between the engaged surfaces 15a and 16a, since these are lapped to an extreme degree of smoothness and are firmly biased into abutting relation by the springs 24. And while the oil is sealed within the housing, by the same token dirt and foreign particles which might destroy bearings, are sealed out. In the event that some particles should work between the outer portion of the sealing surfaces 15a and 16a, they are trapped in the grooves 15e and a new sealing contact brought about by engagement of the adjacent inner ridge on the surface 15a with the mating surface 16a.

Moreover, the mounting ring 22 in the arrangement described is relatively small and easily formed, for example, by stamping, casting or forging. The boot 28 serves both as a flexible sleeve to permit axial movement between the sealing ring 15a and mounting ring 22, and as a gasket sealing the mounting ring 22 to the housing. But the entire organization contributes to the construction of the sealing ring 15 as a large massive part relative to the size of the entire seal. Because of its size, the sealing ring 15, for any given material employed, is extremely strong and permits the use of a small number of stiff springs 24 rather than a great number of weak springs to obtain a high sealing pressure between the surfaces 15a and 16a. And because the ring 15 is large and strong, as well as floatably connected to the mounting ring 22 except for rotational restraint by the keys 22d, it is substantially immune from the effects of thermally or mechanically induced deformations of the housing 12 and shaft 11. The surface 15a maintains its original true shape—perfectly circular and perfectly flat at the point of contact with the mating surface 16a—under all conditions.

Although the first embodiment of the invention has been described with reference to the large and massive ring 15 held stationary and the mating ring 16 rotatably connected with the shaft, it will be apparent to those skilled in the art that the seal may be reversed. That is, the advantages of the invention may also be realized by mounting the mating ring 16 on a stationary part or housing and coupling the mounting ring to a flange on the shaft so that the mounting ring 22 and massive sealing 15 rotate with the shaft.

It has been stated above that the mating sealing rings 15 and 16 have their surfaces 15a and 16a accurately lapped to a high degree of smoothness in order that sealing is accomplished while they rub one on the other. The material for these sealing rings may be selected from a wide range of those known to be effective in sealing applications, depending primarily upon the fluid which is to be contained and correspondingly upon the pressure which the springs exert in biasing the two surfaces into engagement. Merely by way of example, the rotating sealing ring 16 may be formed of high quality steel, while the stationary sealing ring 15 may be made of compressed carbon or graphite. This combination of sealing ring materials has been found particularly effective in containing oil or the like. Other materials may be employed for containing other fluids or gases under pressure. For example, the sealing rings may be made of such materials as Bakelite, mica, nylon or synthetic plastic, bronze, and silver. The noteworthy point is that some materials which are desirably employed for the sealing rings are relatively weak structurally although their sealing performance is better in some instances than stronger material such as steel. For this reason, it is particularly important that a sealing ring such as the rotary ring 15 be made relatively large and massive in order that it have sufficient strength to resist any deformation which might distort its accurately lapped surface.

Turning now to Fig. 4, a first modified embodiment of the invention is there illustrated, parts similar to those employed in the seal illustrated by Figs. 1–3 being identified by the same reference characters. This embodiment, which is shown in half section, is intended for use in applications where the rotating sealing ring 16 carried by the shaft 11 is located inside the housing 12 so that it becomes necessary to prevent dirt which might enter the shaft opening 14 from reaching the interior of the housing. For this purpose, the modification shown in Fig. 4 differs principally from that illustrated by Fig. 1 in that the flexible sleeve or boot 28 has its axially extending portion located radially inside the mounting ring 22 and the rotating stationary sealing ring 15. The innermost axial end of the boot 28 is bonded to the inner surface of the ring 15 and clamped in place by a metal band 29 which is in radial compression. Further, the mounting ring 22 has its axial wall portion 22a located at the outermost edge of the radial wall portion 22b, the outer end of the boot 28 being turned radially beneath the lateral wall portion to serve as a gasket between the inner face of the housing 12 and the mounting ring 22. The mounting ring is provided with axially projecting, circumferentially spaced pins (not shown), similar to those shown in Fig. 1, such pins projecting through the radial gasket portion of the boot 28 and into correspondingly located recesses in the inner face of the housing 12.

As an additional difference, it will be seen that the lapped surface 15a of the stationary ring 15 is inclined with respect to the mating surface 16a, but is not provided with the grit-trapping grooves 15e as in the first embodiment. This is to indicate that the grooves 15e may be omitted from the inclined surface 15a to provide a reliable seal, where the seal is contained within the housing or where the conditions are such that a great amount of grit, sand or other foreign particles are not encountered. By the employment of an inclined surface 15a, however, the successive wear on the stationary ring 15 progressively shifts the point of sealing contact radially outward to maintain fluid-tight sealing contact. This is particularly desirable where the sealing ring 15 is made of relatively soft material such as compressed carbon or graphite.

The operation of the first modified embodiment shown above is substantially the same as that described with reference to Figs. 1–3. It will be apparent that oil cannot escape from within the housing 12 either between the mounting ring 22 and the housing, or between the mounting ring 22 and sealing ring 15 by virtue of the sealing boot 28 which serves also as a gasket. And with the springs 24 biasing the sealing surfaces 15a and 16a into firm engagement, little or no oil can escape between them. Nevertheless, the arrangement described permits the sealing ring 15 to be of relatively great and massive proportions compared to the size of the other components; it is not readily subjected to deformations which might destroy the uniformity of its sealing surface.

Figure 5:
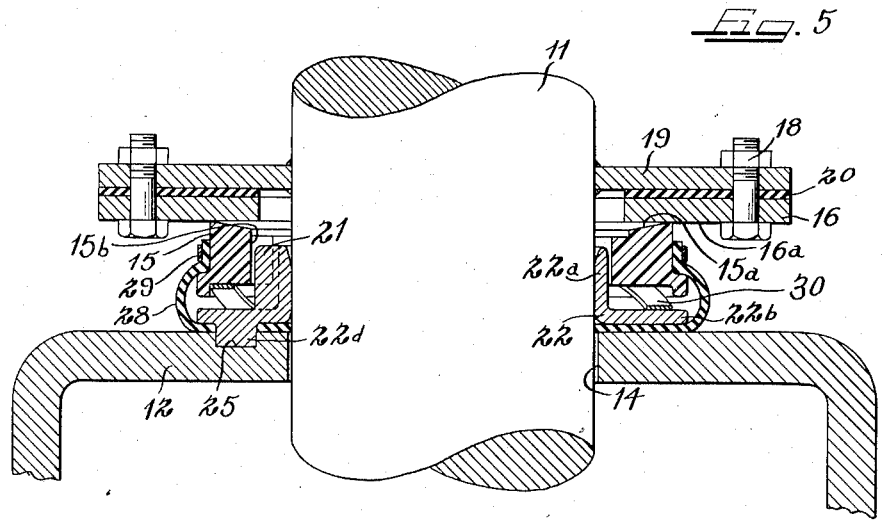
Fig. 5 is a sectional view, similar to Fig. 1, of a rotary seal constituting a second modified embodiment of the invention.

Referring next to Fig. 5, a second modification of the invention is there illustrated, corresponding parts being identified by the same reference characters employed in Figs. 1–3. This second modified embodiment differs from the first described embodiment principally in that an annular wavy spring 30, preferably fashioned of steel, is interposed between the mounting ring 22 and the sealing ring 15 in order to bias the two axially apart and effect a firm engagement between the mating and sealing surfaces 15a and 16a. Such a wavy spring may be advantageously employed in applications where the biasing forces required are not of great magnitude. Accordingly, Fig. 5 indicates that the invention may be practiced with various types of spring biasing means while realizing all of the advantages mentioned above. It will be apparent that the seal shown in Fig. 5 operates in substantially the same manner as that described in connection with Fig. 1. The stationary sealing ring 15 may be formed of a relatively weak material, such as compressed carbon, yet made of sufficiently large cross section, relative to the size of the other components so that it is strong enough to resist thermally or mechanically induced deformations of the machine parts.

I claim as my invention:

1. In a rotary seal for preventing the transfer of fluid around a shaft journaled in and extending through a housing, the combination of a mounting ring having a first and a second face, a plurality of circumferentially spaced keys extending axially from said first face, a sealing ring having one end lapped to a smooth surface extending at an acute angle to a plane radial of the ring together with means defining a plurality of concentrically spaced grooves in the surface constituting progressive grit traps, said sealing ring having its other end formed to define a plurality of circumferentially spaced axial keyways for receiving respective ones of said keys, said sealing ring also having in said other end a plurality of axial recesses circumferentially spaced between said keyways a plurality of circumferentially spaced compression springs directly interposed between said first face of said mounting ring and said sealing ring in the recesses of the latter to bias the two rings axially apart, a flexible sleeve having one marginal edge bonded to the peripheral surface of said sealing ring and the opposite marginal edge overlying and bonded to said second face of said mounting ring, and means projecting through said opposite marginal edge for securing said mounting ring to the housing, said sealing ring being of greater axial thickness than said mounting ring and by virtue of its floating engagement with the mounting ring being immune from distortion of its lapped surface upon mechanically and thermally induced dimensional changes occurring in said housing.

2. In a rotary seal, the combination with a mounting ring relatively thin in an axial direction and having axially extending pins on one side for attachment of the same to a machine component and having a plurality of circularly spaced axial projections on the other side, of a sealing ring of great axial thickness relative to that of said mounting ring and having axial keyways in one end for receiving respective ones of said projections and a smooth lapped surface on the other end which is inclined at an acute angle to a plane transverse to the axis of rotation, means defining a plurality of concentrically spaced grooves in said lapped surface to progressively trap grit, and spring means interposed directly between said rings to bias them apart, the sealing ring by virtue of its thickness and floating engagement with the mounting ring thereby being substantially immune to mechanical and thermal distortion of machine components.

3. In a rotary seal for preventing the transfer of fluid around a shaft journaled in and extending through a housing or the like, a pair of sealing rings concentrically surrounding the shaft and mountable respectively on the housing and shaft, said rings having opposed, smoothly lapped surfaces one of which is disposed radially of the shaft and the other of which is inclined at an acute angle with a plane radial of the shaft, said inclined surface having a plurality of concentric, annular grooves therein, and means for biasing one of said rings toward the other to bring said surfaces into sliding sealing contact.

4. In a rotary seal for preventing the transfer of fluid around a shaft and a member rotatable relative to the shaft, a pair of sealing rings concentrically surrounding the shaft and mountable respectively on the member and the shaft, said rings having opposed, smoothly lapped surfaces one of which is inclined at an acute angle with a plane transverse to the axis of rotation of the shaft and the member, one of said surfaces having a plurality of concentric, annular grooves therein, and means for biasing one of said rings toward the other to bring said surfaces into sliding, sealing contact.

5. In a rotary seal, the combination of a mounting ring relatively thin in an axial direction and having axially extending pins on one side for attachment of the same to a machine component and having a plurality of circularly spaced axial projections on its other side, a sealing ring of relatively great axial thickness having axial keyways in one end for receiving respective ones of said projections and a smooth lapped surface on the other end, said surface being inclined at an acute angle from a plane transverse to the axis of said sealing ring, said sealing ring also having a series of annular, concentric grooves in said surface, and spring means interposed directly between said rings to bias them apart.

References Cited in the file of this patent

UNITED STATES PATENTS

| | | |
|---|---|---|
| 2,243,255 | McDonald | May 27, 1941 |
| 2,251,219 | Brummer | July 29, 1941 |
| 2,301,723 | Vedovell | Nov. 10, 1942 |
| 2,480,908 | Davies | Sept. 6, 1949 |
| 2,500,898 | Hastings | Mar. 14, 1950 |
| 2,639,170 | Sheck et al. | May 19, 1953 |
| 2,736,624 | Schoenrock | Feb. 28, 1956 |